United States Patent
Ohtsuka

(10) Patent No.: US 6,327,049 B1
(45) Date of Patent: Dec. 4, 2001

(54) ORDER INFORMATION RECORDING MEDIUM AND ORDER FILE GENERATING APPARATUS FOR PHOTOGRAPHIC SERVICE

(75) Inventor: Shuichi Ohtsuka, Kanagawa-ken (JP)

(73) Assignee: Fuji Photo Film Co. Ltd., Minamiashigara (JP)

( * ) Notice: Subject to any disclaimer, the term of this patent is extended or adjusted under 35 U.S.C. 154(b) by 0 days.

(21) Appl. No.: 09/163,426

(22) Filed: Sep. 30, 1998

(30) Foreign Application Priority Data

Sep. 30, 1997 (JP) .................................................. 9-266568
Jul. 8, 1998 (JP) ................................................. 10-192765

(51) Int. Cl.⁷ ................................................ G06K 15/00
(52) U.S. Cl. .......................................... 358/1.18; 358/1.1
(58) Field of Search ..................... 358/1.1, 1.13, 358/1.15, 1.18; 710/10, 14; 707/500, 505, 509, 517, 522, 523

(56) References Cited

U.S. PATENT DOCUMENTS

| | | |
|---|---|---|
| 4,637,712 | 1/1987 | Arnold et al. . |
| 4,661,000 * | 4/1987 | Shinbori ............................... 358/1.18 |
| 5,477,353 | 12/1995 | Yamasaki . |
| 5,878,198 * | 3/1999 | Yuasa et al. ........................ 358/1.18 |

FOREIGN PATENT DOCUMENTS

0684520A1   11/1995   (EP) .

* cited by examiner

Primary Examiner—Arthur G. Evans

(57) ABSTRACT

When a printing service for processed images is carried out in a digital photographic service, a load on data transfer can be reduced and usage of image data or templates can be limited. High resolution image data and templates are not provided to users but stored in a system of a service provider. A user carries out processing ordering by using low resolution image data and template for display. Upon placing an order, an order file describing ID information or the like to specify the image data and the template is provided to a laboratory.

12 Claims, 6 Drawing Sheets

ORDER INFORMATION RECORDING MEDIUM AND ORDER FILE GENERATING APPARATUS FOR PHOTOGRAPHIC SERVICE

BACKGROUND OF THE INVENTION

1. Field of the Invention

The present invention relates to an order information recording medium used in the case where printing of a processed image using a template is ordered to a network photographic service system which provides a photographic service utilizing a plurality it of server computers distributed on a network, and to an order file generating apparatus for generating an order file to be recorded in the recording medium.

2. Description of the Related Art

A digital photographic service using the Internet has become available recently. According to this service, if digitization and storage of images are ordered at the time a film is deposited for developing, for example, the photographs recorded on the film are disclosed on the Internet only to the orderer. Therefore, the orderer can order additional printing or the like without going to a service provider by referring to the disclosed photographs on a personal computer connected to the network.

Meanwhile, a service has been carried out for a long time wherein a new year's greeting postcard including a photograph therein is generated by using a template comprising a character string and an illustration for new year's greeting and a blank area for inserting the photograph therein. In such a service, available templates are shown at a counter in a laboratory or the like, and by using the template selected by a user, an operator of the laboratory carries out the processing. However, in a digital photographic service such as that described above, a preferred method is to provide the template itself to a user as digital data and for the user to carry out processing by himself/herself, and only print output is carried out in a laboratory.

In order to generate a high quality photographic print, high resolution image data are necessary. Therefore, when a user carries out processing as in the above, the user carries out the processing by obtaining high resolution image data and a high resolution template and an order is placed from the laboratory by providing the processed image data at high resolution.

However, having high resolution means having a large data size. Therefore, a large capacity recording medium or a high-speed network is necessary to provide a template from a laboratory to a user or to provide a processed image from a user to a laboratory. As a result, a load on data transfer has been heavy.

Furthermore, there has been a request that high performance templates including complex processing procedures or templates including illustrations of famous characters or the like should be chargeable on a usage basis or provided with limited usage. However, in a conventional service, usage of a template once it has been provided to a user has not been restricted.

SUMMARY OF THE INVENTION

Based on consideration of the above problems, an object of the present invention is to reduce a data transfer load and to limit the usage of a template when a printing service of processed photographs is carried out in a digital photographic service.

In order to solve the above problems, the present invention proposes the content of order information provided from a user to a laboratory in a print order receiving system having a certain condition.

In other words, an order information recording medium of the present invention records order information input via an order receiving server in a system comprising a data server which stores and manages at least a template describing a processing procedure for image data used for generating a photographic print, the order receiving server which receives a printing order based on the image data and the template, and a print server which is connected to both the data server and the order receiving server and generates a processed print by obtaining necessary image data and template according to an instruction from the order receiving server, wherein image information specifying the image data for generating the processed print and showing information necessary for the print server to obtain the image data;

template information specifying the template to be used for the processed print generation and showing information necessary for the print server to obtain the template from the data server; and print information specifying the content of print output of the processed print is included.

The "data server which stores and manages at least a template" means that only the template is stored in the data server, and it is not necessary for the image data be stored therein. It is needless to say that the image data may also be stored in the data server.

In the above system, the data server is not necessarily limited to one server. When image data are also stored in the data server, separate data servers such as a data server for image data and a data server for templates may be used. Likewise, a plurality of order receiving servers or print servers may exist. Here, one server does not necessarily correspond to one physical apparatus. For example, one computer may comprise both functions of the data server and the print server. In other words, in this specification, a server means a combination of software for realizing a function and hardware controlled by the software.

A template is composed of a background image and a processing procedure such as commands. The processing procedure defines an angle or position of an image, processing method (overwrite or fusion composition, for example) used for an overlapping portion when plural images are positioned, mask data (vector data used for a drawing and bit map data used in the case of transparent processing) for mask processing, for example. The template may include definition of not only the processing procedure for image data but also vector data representing a drawing placed together with the image data, color and position information of the drawing, a position of a character string placed together with the image data, font, size, color, and style (italic, for example) of the character string and so on.

To "store and manage" data means to record data in a data recording medium such as a hard disc under a file name according to a predetermined rule or by adding an ID or the like to the data so that the data are stored in such a state that a search of the data is possible. In other words, "information necessary for the print server in order to obtain the image data" or "information necessary for the print server in order to obtain the template from the data server" means the ID or the file name. Based on the information, the print server searches for the necessary image data or searches a predetermined directory in the data server for the template and downloads the image data or the template. The print server is assumed to have recorded the address of the data server or the predetermined directory. In the case where the image data are also stored in the data server, the print server searches a predetermined directory in the data server. When the image data are stored in a portable recording medium, the print server searches the recording medium to obtain the image data.

In the case where a service provider does not wish to disclose the location of the data server, it is preferable for least necessary information regarding the data server to be recorded in the print server as has been described above so that specification by an ID or the like is received. When there is no problem caused by the disclosure, a URL or the like including the address of the data server may be provided as order information so that the print server does not need to record the location of the template or the like in advance.

The "content of print output of the processed print" means the size and the quantity of the print, for example. The processing carried out upon the output, such as gloss finish, is also included in the content of the print output.

The above order information recording medium may record output permission information requested by the system when printing is ordered by specifying predetermined image data or template.

The "output permission information" herein referred to means a password showing a right to access image data or a template, information showing consent to a charge for using a template, a credit card number for charging a fee, or the like. For example, when a password is used, if one password is issued for each user, others cannot use image data of the user without permission. If a password is issued in exchange for payment for a template, only users who have paid for the template can use it. The output permission information may include plural kinds of information, such as information for image data and for templates, for example.

The above order information recording medium may record processing information showing various kinds of specification regarding the processing procedure which is necessary in the case where printing is ordered by specifying a template including a processing procedure regarding data other than image data. For example, in a template for a new year's greeting postcard including a photograph, a processing procedure such as positions of the photograph and character strings such as a name and an address, and the font or the like are defined as the processing procedure. In such a case, it is preferable for the name and address to be recorded as the processing information in the order information recording medium.

The above image information, template information, output permission information, and processing information may be recorded in separate files in the recording medium. More preferably, the above information is recorded in a file having a hierarchy structure and each kind of information is described as a component of the hierarchy in the file.

An order file generating apparatus of the present invention generates such an order file. In other words, the order file generating apparatus of the present invention generates an order file describing order information to be input via an order receiving server in a system comprising a printing quality data server which stores and manages at least a printing quality image generating template describing a processing procedure for printing quality image data used for generating a photographic print, the order receiving server which receives a printing order based on the printing quality image data and the printing quality image generating template, and a print server which is connected to the printing quality data server and to the order receiving server and generates a processed print by obtaining necessary printing quality image data and printing quality image generating template based on an instruction from the order receiving server, and the order file generating apparatus comprises:

data presenting means which stores and manages monitoring quality image data representing the same image that is represented by the printing quality image data in a quality lower than that of the printing quality image data and a monitoring quality image generating template which carries out processing equivalent to the processing carried out by the printing quality image generating template on the monitoring quality image data, and displays the monitoring quality image data and the monitoring quality image generating template on an order processing terminal;

image specifying means which receives specification of desired monitoring quality image data and a desired monitoring quality image generating template among the monitoring quality image data and the monitoring quality image generating templates displayed on the order processing terminal and transfers the specified monitoring quality image data and the monitoring quality image generating template to the order processing terminal;

finish confirming means which carries out processing on the monitoring quality image data having been transferred by using the monitoring quality image generating template having been transferred, and generates and confirms a processed image representing the finish of the processed print; and file generating means which generates a file including image information showing information necessary for the print server in order to obtain printing quality image data corresponding to the specified monitoring quality image data and information necessary for the print server in order to obtain a printing quality image generating template corresponding to the specified monitoring quality image generating template from the printing quality data server.

The order file generating apparatus is realized by installing dedicated application software in a user's personal computer and by providing a recording medium wherein monitoring quality image data or templates for order placement have been recorded. Alternatively, the system may be implemented by installing a portion of the function as application software in the user's personal computer and by disclosing the image data and templates for order placement in the form of a web page on the server computer of a service provider so that an order file can be generated on line.

The monitoring quality image data and monitoring quality image generating templates for order placement are the data having insufficient quality for printing but still preserving a characteristic of corresponding print quality image data or print quality image generating template, despite of their small data size. More specifically, the monitoring quality image data and monitoring quality image generating templates for order placement mean data at lower resolution than that of the corresponding printing quality image data or printing quality image generating templates, data compressed at a high compression ratio, data representing an outline of an image alone, data representing a monochrome image, or the like. By reducing the amount of data in this manner, data exchange and processing can be carried out easily. When a low resolution is used, the monitoring quality image data and monitoring quality image generating templates for order placement have a resolution approximately ¼ of that of printing quality image data and templates. More specifically, the resolution for printing is approximately 400 dpi while the resolution for order placement is approximately 100 dpi. Vector images in a template for printing have more points for description while those for order placement have less points. In this manner, the data size for order placement is reduced.

In the case where a template including a processing procedure regarding data other than image data is specified, it is preferable for the finish confirming means to enable confirmation of various kinds of specification regarding the processing procedure and a result of carrying out the processing procedure, and it is preferable for the order file generating means to describe processing information showing the content of the various kinds of specification regarding the processing procedure in the order file.

The order file generating apparatus may comprise output specifying means which enables specification of the content of print output of the processed print; and the order file generating means may describe the specified content of the output as output information in the order file.

In this case, if the print size of the processed print is specified as the content of the print output, it is preferable for the finish confirming means to display the processed image in an aspect ratio equal to that of the specified print size.

It is preferable for the image specifying means to request input of output permission information when predetermined image data and a predetermined template are specified; and it is preferable for the order file generating means to describe in the order file the output permission information having been input.

The printing quality image data may be stored in the printing quality data server.

In this case, the printing quality data server may store and manage the printing quality image data and the printing quality image generating templates in separate recording apparatuses; and the data presenting means may store and manage the monitoring quality image data and the monitoring quality image generating templates in separate recording apparatuses.

In the printing order using the order information recording medium of the present invention, templates used for generating prints are not provided to a user, but stored in a system of a service provider only. At the time of ordering the print, only ID information identifying the image data and the template is provided to the laboratory. Therefore, the amount of data is reduced and the printing quality image generating template does not get used for a purpose other than the printing service.

If output permission information is provided as a portion of the order information and the output permission information is judged by the order receiving server, usage of the image data and templates by unauthorized users is denied.

Furthermore, by providing the content of processing regarding data other than image data, such as a change of characters in a template, as a portion of the order information, a user can describe more detailed specification regarding processing.

Moreover, by providing the order information as a file, correspondence between an order and order information becomes clear, which leads to easier reception management.

According to the order file generating apparatus of the present invention, when order processing is carried out, monitoring quality image data and templates for order placement are displayed on a terminal. Order information is generated after processing is carried out on a terminal screen by using these data and the processed image is confirmed. Therefore, order information accurately expressing the intention of a user is recorded in an order file.

Order processing apparatuses (application software) which specify the size and quantity of prints or the like have already been provided. By adding a function to specify the size and quantity of prints or the like after confirmation of a processed image to the above order file generating apparatus, a flow of an order from processing to output is carried out, without using 2 separate apparatuses (2 kinds of software). Furthermore, by specifying processing and output in parallel, it becomes possible to display a processed image in an aspect ratio the same as that of the specified print size, and an image closer to the actual print can be confirmed.

DESCRIPTION OF THE PREFERRED EMBODIMENT

Figure 1:
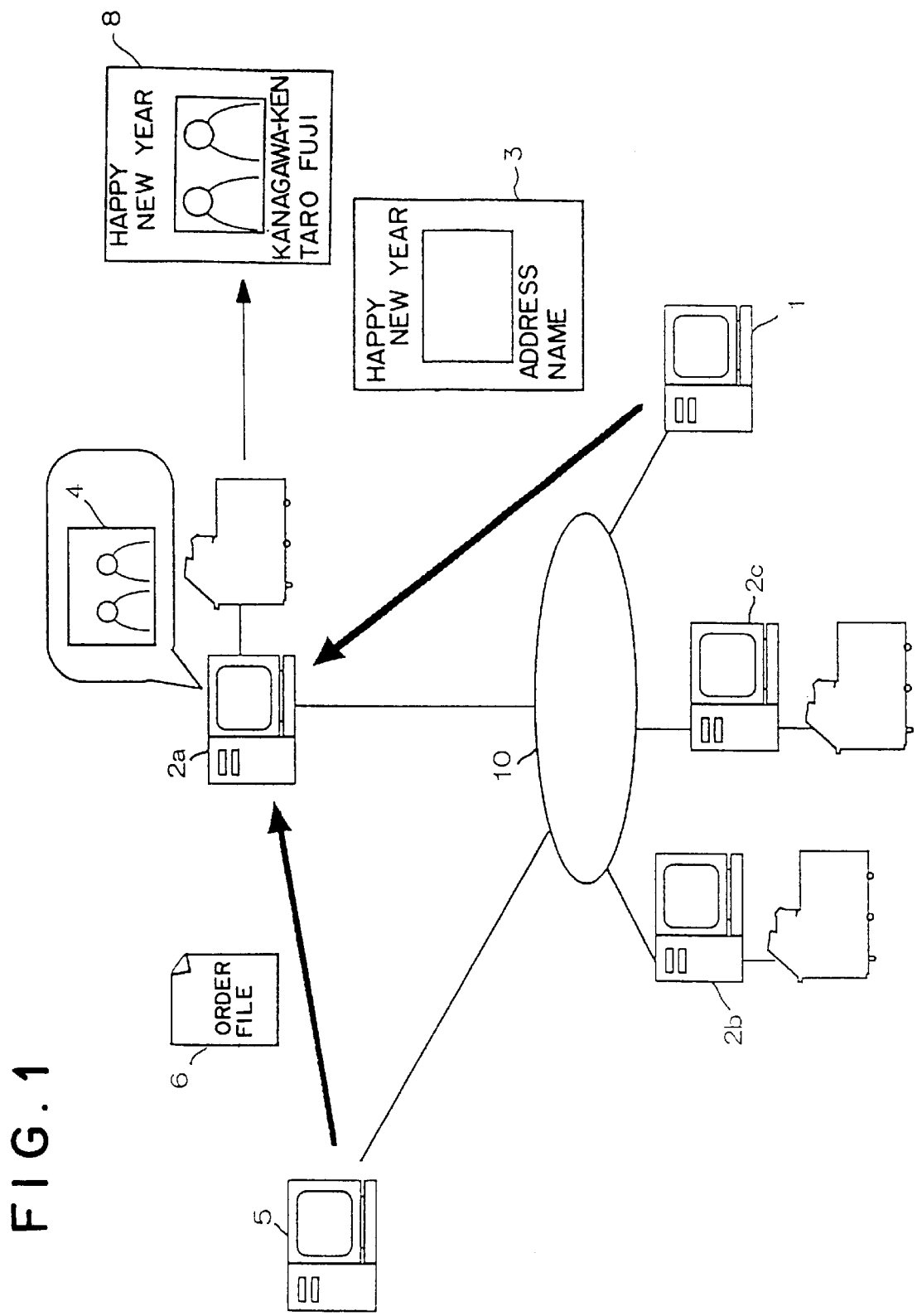
FIG. 1 is a diagram showing an outline of a network photographic service system.
Figure 2:
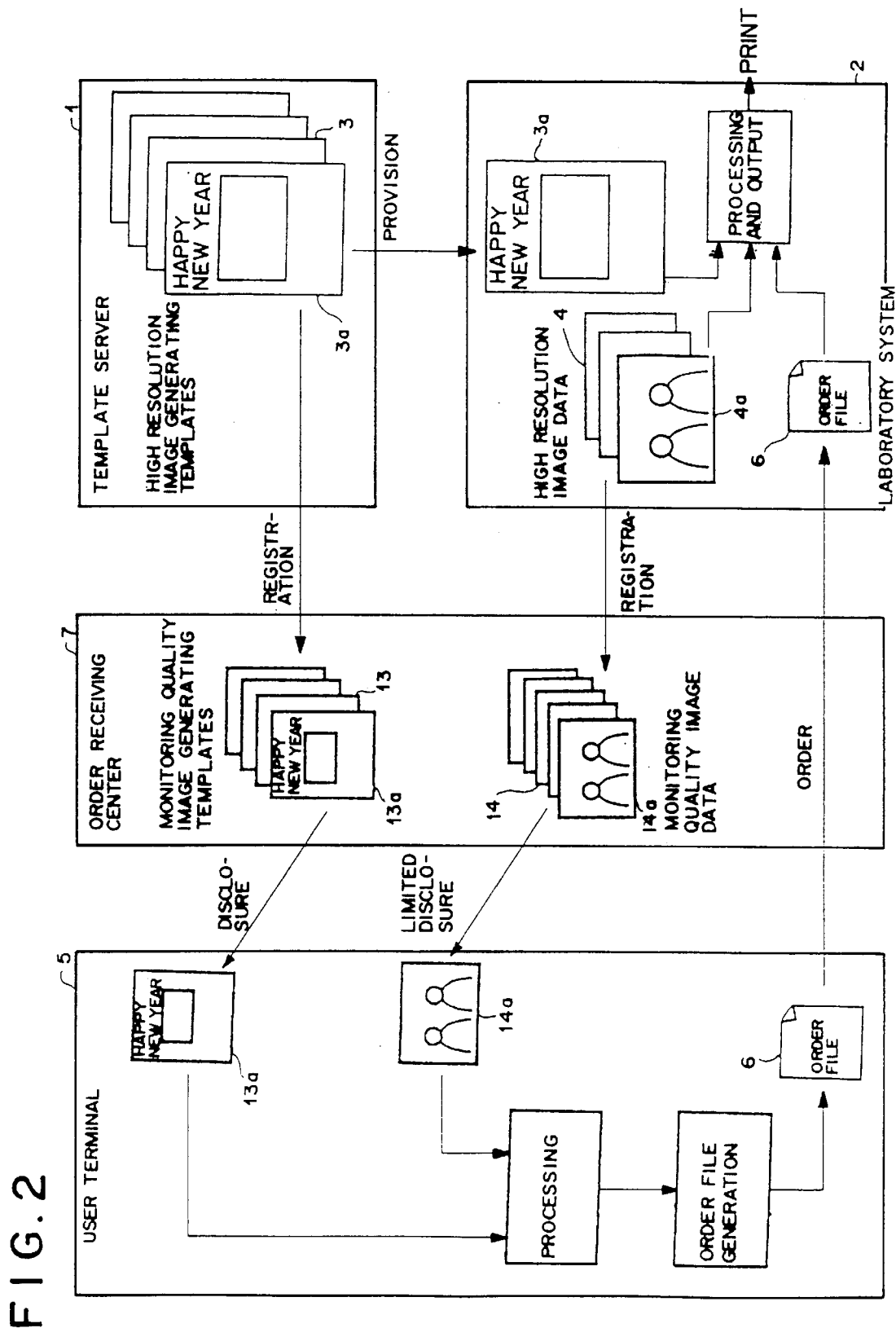
FIG. 2 is a diagram showing a function of the system in FIG. 1 with attention paid to data.

Hereinafter, an embodiment of an order information recording medium and an order file generating apparatus of the present invention will be explained referring to the accompanying drawings. FIGS. 1 and 2 show an example of a network photographic service system wherein the order information recording medium and the order file generating apparatus of the present invention are used. FIG. 1 shows an outline of the system and FIG. 2 shows a function of the system with attention paid to data.

In FIGS. 1 and 2, a user terminal 5 is a personal computer of a user, or an order processing terminal installed at a service provider for users who do not possess personal computers. A laboratory system 2 (2a, 2b, and 2c) is a system which carries out print output. A template server 1 is a server computer managing templates.

The laboratory system 2 and the template server 1 are connected by a network 10 such as the Internet or a network using dedicated lines. It is preferable for the user terminal 5 to be able to connect to the network 10 upon necessity. However, as long as an order file is exchangeable with the laboratory system 2 via a recording medium such as a floppy disc, it is not necessarily connected to the network 10.

In this system, a user registers an image of the user in the system of the service provider. As shown in FIG. 2, by this registration, the laboratory system 2 stores high resolution image data 4 for print output. The high resolution image data 4 may be stored in a hard disc of the laboratory system 2 by reading a film in advance, or the reading may be carried out upon necessity after receiving the film from the user upon the registration.

Meanwhile, low resolution image data 14 are provided for the user to display and confirm the image on the user terminal 5. The low resolution image data 14 may be provided to the user in the form of a CD-R or the like which stores the data. Alternatively, as shown in the example in FIG. 2, the data themselves are managed by an order receiving center 7 or the like of the service provider and disclosed only to the user on the network. In each case, by registering the image, the user can determine the content of an order by confirming the image on the user terminal 5.

A template used for generating a processed print is recorded in the template server 1 as high resolution data (high resolution template 3) which can be used as they are upon print generation. At the same time, the same template is registered in the order receiving center 7 as low resolution data (low resolution template 13) for display. However, if a template does not represent an image but a processing procedure, there is no classification by resolution and the same template is recorded in the laboratory system 2 and the order receiving center 7.

Figure 5:
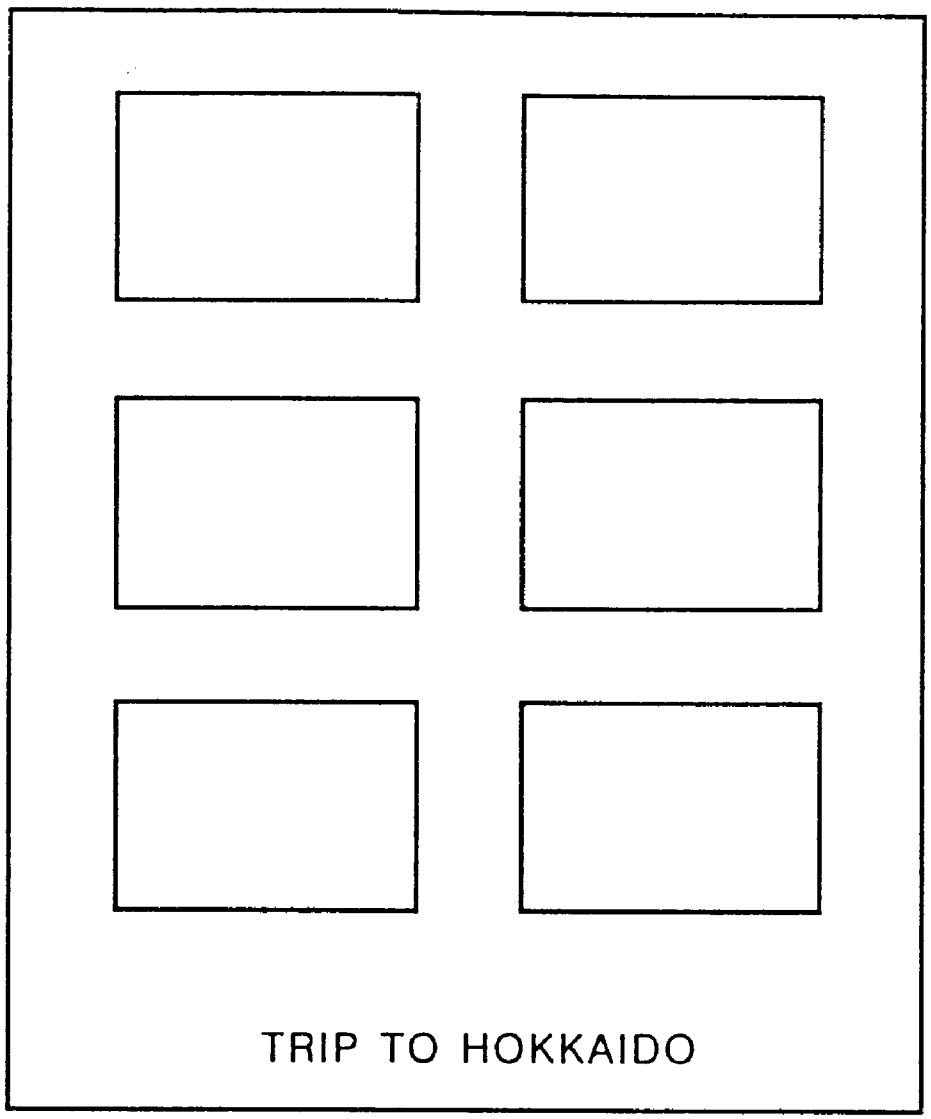
FIG. 5 is a diagram showing an example of a template wherein a plurality of images are placed.

As the template, two types can be specified, namely "plural-image layout" and "combination with a template". The plural-image layout positions a plurality of specified images with a template image mainly in a plain color or with a pattern, as shown in FIG. 5. The user can generate an album (album prints) by choosing the plural-image layout. In the plural-image layout, the position of each image or a specified character string, the font of the characters, the size, the color, and the transparency ratio (the ratio of the area occupied by the images to the area of the background image) are all predefined for each template.

Figure 6:
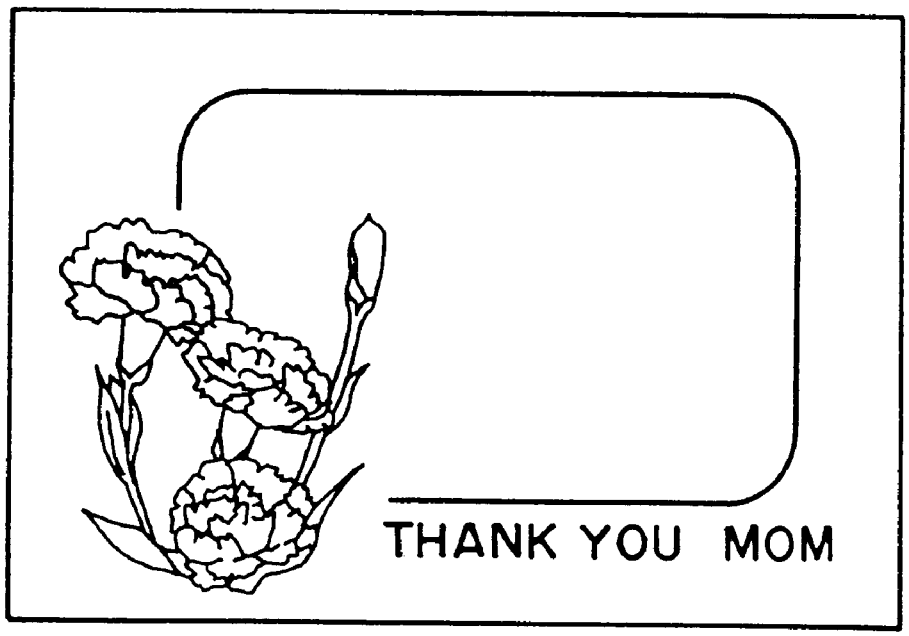
FIG. 6 is a diagram showing an example of composition by using a template.

The combination with a template combines a template image wherein clip-arts or the like are laid out with a specified image, as shown in FIG. 6. For example, if an area to be printed has been specified, the specified area is trimmed out from the original image and embedded in the template image. In the combination with a template, embedding of the title, the date of photographing, and clip-arts can also be realized.

The user browses low resolution image data 14 and low resolution templates 13 registered in the order receiving center 7, and downloads desired low resolution image data 14*a* and a desired low resolution template 13*a*. At this time, if the template specified by the user requires a fee for use, a warning message notifying that the fee is charged for the template is displayed. If the template has some limit in its usage even when no fee is charged for the template, a warning message is also displayed. When the warning message is displayed, the user needs to select whether he/she carries out the download after understanding the warning, or cancels the download. This selection is carried out by clicking a button displayed on the screen.

After the download of the low resolution image data and the low resolution template is finished, the user carries out processing such as pasting the image on the template or insertion of an illustration or characters. The processing carried out at this stage aims at generation of information to be recorded in an order file and a processed image obtained through the processing is used for confirmation only.

The user specifies the print size and print quantity or the like of the processed image on the screen. At this time, the processed image is displayed in a frame having the aspect ratio the same as that of the specified print size on the screen of the user terminal. In this manner, not only the confirmation of the image but also the confirmation of the image as a print, such as whether no trimming occurs or whether the width of a white margin is appropriate, is carried out.

The procedure of the processing that the user has carried out is recorded by a function-of dedicated software installed in the user terminal 5. Based on this processing procedure, an order file 6 including image information identifying the processed image, template information identifying the template used for the processing, and processing information describing a change in the template or the like is generated. The order file having been generated is provided to the laboratory system 2 directly or via the order receiving center 7.

The laboratory system 2 (2*a*) searches for the specified image among the registered images, and outputs a print by processing high resolution image data 4*a* having been found according to the information in the order file 6. At this time, a specified template 3*a* is obtained from the template server 1 via the network. The location of the template server and the directory under which the template is stored may have been recorded in the laboratory system 2 or may be specified as a portion of the template information together with the ID.

Figure 3:
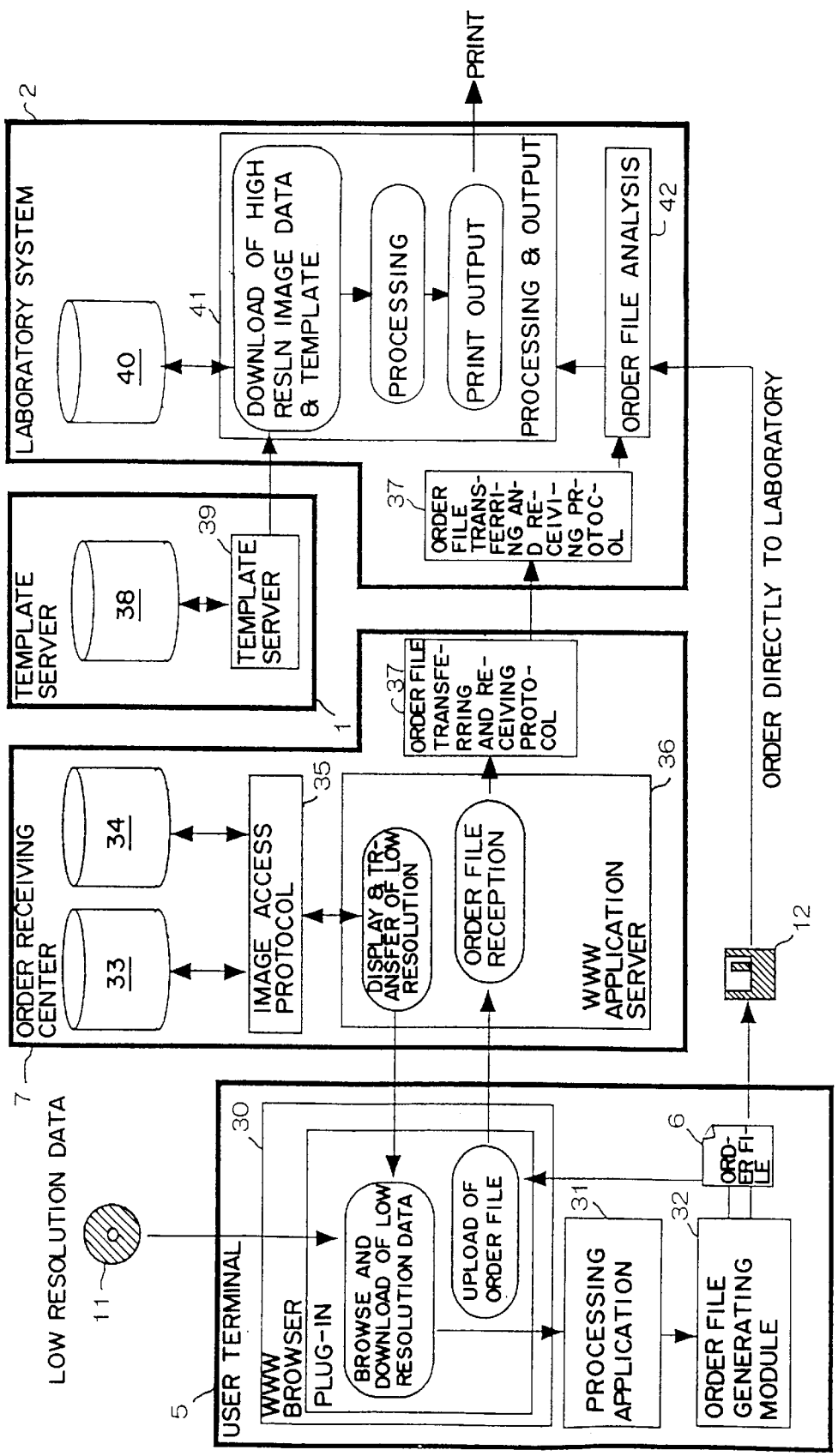
FIG. 3 is a diagram showing a configuration of the system in FIG. 1.

The function having been described above can be realized by a system configuration shown in FIG. 3, for example.

The user terminal 5 for carrying out the order processing will be explained first. In the user terminal, a known WWW browser 30 such as Netscape Navigator or Internet Explorer is installed. A program for carrying out the order processing is provided as a plug-in of the browser. Alternatively, the function which carries out a portion of the order processing may be installed as a plug-in, and other functions may be installed as application software independent from the browser.

The example in FIG. 3 shows the case where functions for browsing and downloading low resolution image data and low resolution templates and for uploading an order file are provided as plug-ins, while processing application 31 for processing the downloaded image data and template, and an order file generating module 32 for generating an order file are provided as separate application software.

In this embodiment, if specification of the print size and quantity is carried out by the processing application 31 as in ordinary printing (printing by a printer connected to a personal computer), an order file is automatically generated by the function of the order file generating module 32.

When the low resolution image data and the low resolution template are provided by a recording medium 11, the WWW browser 30 is used for browsing the data in the recording medium 11 and also for copying the data from the recording medium 11 to a hard disc ofthe user terminal 5. The order file 6 having been generated may be brought in to the laboratory directly in the form of a recording medium 12 such as a floppy disc, instead of uploading the order file.

A system configuration of the order receiving center 7 will be explained next. The system in the order receiving center 7 is composed of a server computer comprising a large capacity hard disc and various kinds of communication equipment. The system provides an order receiving service in the form of a web page.

A WWW application server 36 which communicates with the WWW browser 30 in the user terminal accesses a low resolution image data base 33 and a low resolution template data base 34 in response to a request from the user. The application server 36 obtains necessary data and transfers the data to the user terminal 5. The access to the data bases 33 and 34 may be carried out by an original protocol. However, by using a protocol 35 which is common among a plurality of companies, other order receiving centers or other data bases in other server computers are used in the same manner as the data bases in the order receiving center 7. In other words, it is preferable that the common access protocol 35 for carrying out a search for an image or a template, transfer of the image or the template, access right management, and the like is defined and an access to the data bases is carried out by using this access protocol 35.

The WWW application server 36 receives the order file 6 uploaded from the user and transfers the file to the laboratory system according to a predetermined protocol. This protocol (an order file transferring and receiving protocol 37) is used for assigning a laboratory system in response to the content of an order. There are various ways in which the assigning is carried out. For example, when image data stored only in a certain laboratory are specified, the order file is transferred to the laboratory. When an order file instructs an order which is not carried out by a general laboratory (for example, a large size print such as A3), a special laboratory is specified as the laboratory to output the print. When a user specifies the laboratory at which the print is received, the laboratory is specified as the laboratory to output the print. It is also preferable to use a common protocol for this assignment.

A configuration of each laboratory system 2 will be explained next. The laboratory system 2 comprises a work station or a personal computer including communication equipment and a large capacity hard disc, and a digital photographic printer. A film scanner or the like for obtaining high resolution image data is also installed therein. The work station (or personal computer) is loaded with a program 42 which analyzes the order file 6 transferred from the order receiving center 7 and a program 41 which carries out processing and printing according to the instruction in the order file 6. When the analysis of the order file 6 shows no right to use the image specified in the order file, no processing or printing is carried out. When the right to use the image is confirmed, necessary data are obtained from a high resolution image data base 40 of the laboratory system 2 and a high resolution template data base 38 managed by the template server 1 on the network. The processed print is then generated.

Figure 4:
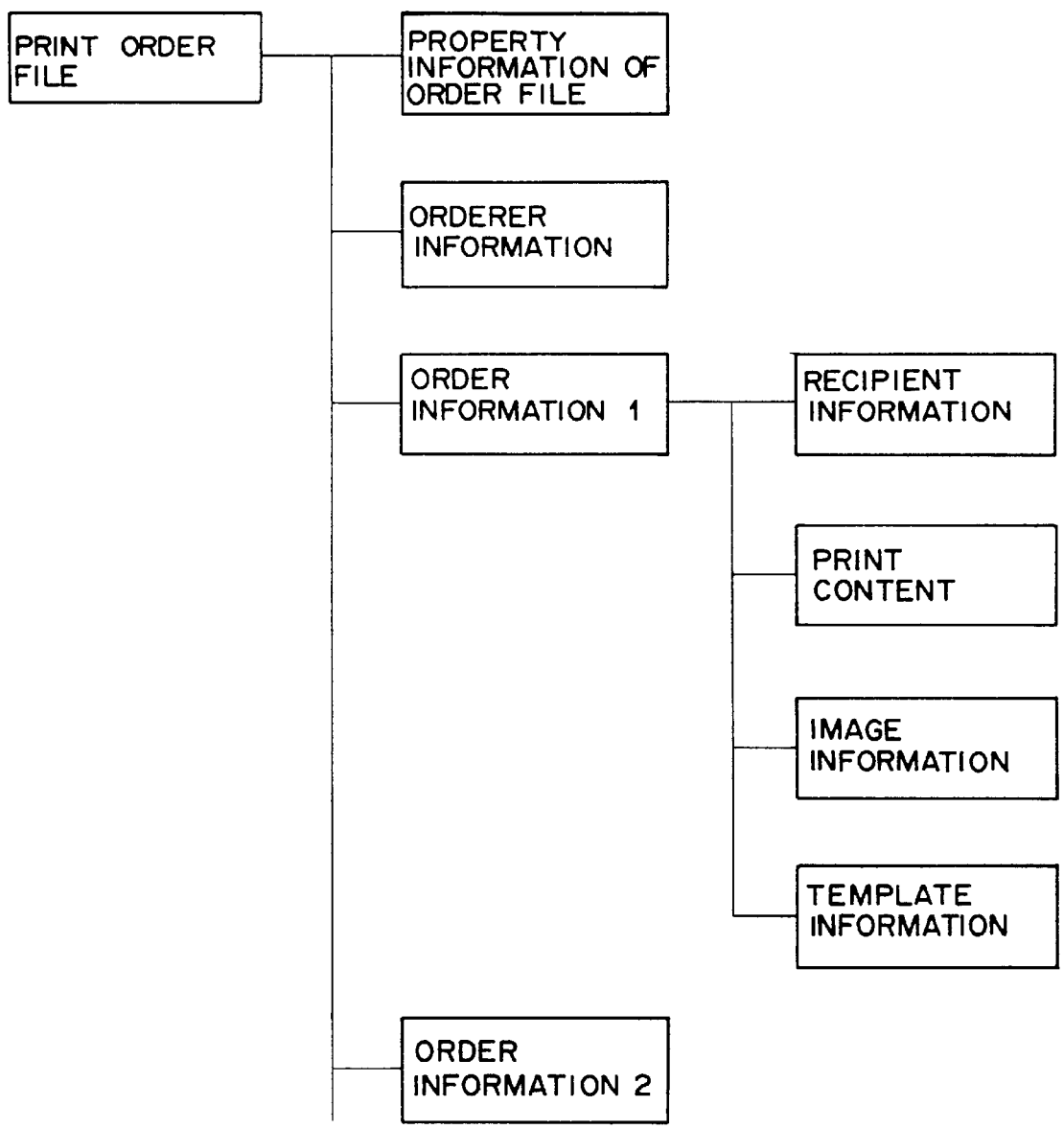
FIG. 4 is a diagram showing an example of an order file structure.

FIG. 4 shows an example of a specific structure of the order file 6 in this embodiment. This file records various kinds of data in a hierarchy structure. Such a storage method is known as a structured storage technique proposed by Microsoft corp. Each data set within the hierarchy is called a stream and the hierarchy is formed by storing each stream in a memory.

The order file shown in FIG. 4 has a structure wherein a stream describing properties of the order file, a stream describing information regarding an orderer, and at least one order information storage describing the order information are stored under a root storage. In each order information memory, streams respectively describing recipient information, a content of a print such as print size, image information, and template information are stored.

Hereinafter, the content of each stream will be described in detail. In the present embodiment, three kinds of information shown in Table 1 are described as property information of the order file. An order file standard version is version management information by which the photograph finishing system distinguishes an order file before and after a change in the order file structure due to function extension or the like. Date of order file generation is the date on which a customer generates the order file. Order file generating software means the kind and the version of personal computer application software which the customer uses upon generating the order file.

TABLE 1

| Information Name | Notes |
|---|---|
| Order File Standard Version | Example: v.1.00 |
| Date of Order File Generation | |
| Order File Generating Software | |

As shown in Table 2 below, the name and address, the phone number, the fax number, an E-mail address or the like for each customer are described as information regarding the orderer and the recipient.

TABLE 2

| Information Name | Notes |
|---|---|
| | [Name Group] |
| Last Name | Example: Fuji |
| Middle Initial | |
| First Name | Example: Taro |
| | [Address Group] |
| ZIP Code | Example: 250-01 |
| Country | Example: Japan |
| State | Example: Kanagawa |
| City/Town | Example: Ashigara-kami-gun |
| Address | Example: 798 Miyadai, Kaisei-Cho |
| | [Number Group] |
| Country Code | Example: 81 |
| Area Code | Example: 0465 |
| Phone Number | Example: 123-4567 |
| FAX number | Example: 123-4568 |
| E-mail Address | Example: aaa@miya.fujifilm.co.jp |

As shown in Table 3 below, the order content stream describes information regarding reception of a finished print, such as whether it will be received over the counter or by delivery, the kind of service, the kind of postcard when printing on a postcard is specified as the kind of service, the variety of photographic paper, the size of the print, the quantity of the print, and the margin width of the print, for example.

The kind of image processing which is carried out on image data upon printing processing is also described. As the kind of image processing, sunset finish for making a print of a sunset look like a beautiful sunset, snow finish for expressing a scene of snow, perspective finish processing for emphasizing distance, painting finish for making a print look like an oil painting, sharp finish for emphasizing sharpness in the finish, scenery finish for emphasizing scenery, portrait finish for expressing a beautiful complexion, soft finish for expressing softness in the finish, high key finish for making a print seem to be in a high key, low key finish for making a print seem to be in a low key, reversal finish for making colors spread well, monochrome finish for finishing a print in monochrome, sepia finish for finishing a print in sepia color, gloss finish for expressing gloss or luminosity, and red-eye correction finish for correcting red eyes, or the like, can be listed.

On the contrary, some users do not wish a service provider to carry out any correction processing. Therefore, it is preferable that no correction, that is, no processing to be carried out, is also included as a choice regarding the finish.

Furthermore, as for trimming processing, if detailed specification of the area to be trimmed is left to a service provider's discretion and a user only specifies a rough area to be trimmed, such as an area including a figure or two figures at the center of a photograph, this information can be included as a choice of the image processing. Alternatively, a user can specify in detail the area to be trimmed by separately including a field describing the coordinates of the area to be trimmed.

Table 4 below shows the sizes which can be used for a variety of services.

TABLE 3

| Information Name | Notes |
|---|---|
| Delivery and/or Reception method | 0: Over the Counter |
| Kind of Service | 1: normal Prints |
| | 2: DSC Prints |
| | 3: Postcard Prints |
| Specification | Effective Only for Postcard Prints |
| | 1: New Year Greeting Cards, |
| | 2: Spring Greeting Cards, |
| | 3: Summer Greeting Cards, |
| | 4: Postal Cards, |
| | 5: Other Postcards |
| Kind of Photographic Paper | 0: Standard |
| Print Size Name | See Table 4 |
| Print Size (Length) | See Table 4 |
| Print Size (Height) | See Table 4 |
| Quantity | Any number from 1 to 9999 |
| Have Print Margin? | 1: No Margin |
| Print Margin Width (Horizontal) | 0 (mm) |
| Print Margin Width (Vertical) | 0 (mm) |
| Image processing Specification | 1: Sunset Finish, |
| | 2: Snow Finish, |
| | 3: Perspective Finish, |
| | 4: Painting Finish, |
| | 5: Sharp Finish, |
| | 6: Scenery Finish, |
| | 7: Portrait Finish, |
| | 8: Soft Finish, |
| | 9: High Key Finish, |
| | 10: Low Key Finish, |
| | 11: Reversal Finish, |
| | 12: Monochrome Finish, |
| | 13: Sepia Finish, |
| | 14: Gloss Finish, |
| | 15: Red eye correction Finish, |
| | 16: No Correction, |
| | 17: Trimming (One Figure), |
| | 18: Trimming (Two Figures) |

TABLE 4

| | Print Size Name | Print Size (Length) | Print Size (Height) |
|---|---|---|---|
| Normal Printing | 1: C Size | 89 mm | 127 mm |
| | 2: H Size | 89 mm | 158 mm |
| | 3: P Size | 89 mm | 254 mm |
| | 4: A5 Size | 210 mm | 148 mm |
| | 5: A4 Size | 210 mm | 297 mm |
| DSC Printing | 1: DSC Size | 89 mm | 114 mm |
| Postcard Printing | 0: No Specification | 102 mm | 146 mm |

As shown in Table 5 below, image information describes the ID of an image to be processed, and the number of the image IDs are limited by each kind of templates. The password of image data may be described as a portion of the image information, or as a portion of the orderer information. The file name of image data, rather than the ID thereof, may be used as well.

TABLE 5

| Information Name | Notes |
|---|---|
| ID of Image 1 (Image1) | Example: 1970103 |
| ID of Image 2 (Image2) | |
| ID of Image 3 (Image3) | |

Table 6 below shows the content of template information. The templates are specified by their IDs, as the images are. The templates may be specified by the name of the template file, rather than the ID thereof. For templates with a charge, different passwords are issued for different templates. Therefore, as a portion of the template information, passwords are described. Furthermore, character string information for characters positioned in a template and processing information showing the content of other changes in the template are also described. The content of other changes means characters to be added at a position which has not been defined in the template, for example.

TABLE 6

| Information Name | Notes |
|---|---|
| Template ID | Example: T003011 |
| Password | |
| Character String 1 | Character string positioned in the template |
| Character String 2 | |
| Other Processing Information 1 | Changes in other portions of the template |
| Other Processing Information 2 | |

The detailed items to be described in the order file may be defined depending on the content of the service, and the above example does not limit the present invention.

As has been described above, the order information recording medium of the present invention does not include image data or templates themselves, but the ID information or the like to identify the image data or the templates, which has a comparatively small data size, is recorded. Therefore, the recording medium can be a small capacity medium such as a floppy disc, and thus there will be no problems regarding long transfer time or cost. It is possible for a service provider to limit the usage of high resolution templates. Practical effects are great for both users and service providers.

In the above embodiment, the order file 6 recorded in the order information recording medium records the information showing that processing is carried out by using the high resolution image data 4a having been stored in the laboratory system 2. In the case where a user possesses the high resolution image data, the high resolution image data to be used for processing may be recorded together with the order information in the order information recording medium and provided to the laboratory system. For example, in the case where processing is carried out by pasting 6 images on the template shown in FIG. 5, if one of the images is possessed by the user, the image information is described as shown in Table 7.

TABLE 7

| Image Information |
|---|
| Image1= //fujinet/tokyo/ohtsuka/0104.fpx |

TABLE 7-continued

Image Information

Image2= //fujinet/tokyo/ohtsuka/0105.fpx
Image3= //fujinet/tokyo/ohtsuka/0106.fpx
Image4= //fujinet/tokyo/ohtsuka/0107.fpx
Image5= //fujinet/tokyo/ohtsuka/0108.fpx
Image6= image004.jpg In Table 7, for Image1 through Image5, the file names of the image data and the name of the directory in the laboratory system 2 under which the files have been stored are shown. For Image6, the file name image004.jpg of the image data having been recorded in the order information recording medium is shown.

Furthermore, the content of the image information is shown in Table 8 below as an example in the case where Image1 is pasted after being rotated by 90 degrees, Image2 is pasted after 10 % of its upper, lower, right, and left portions have been cut, and a character string "Trip to Hokkaido" has been inserted in the template.

TABLE 8

Image Information

Image1_PrintRotation=90
Image2_PrintClopping=10, 10, 80, 90
Text=Trip to Hokkaido In the above embodiment, usage of image data or a template are limited by a password. However, the usage of these data may be limited by information showing consent to a charge for using the template or by a credit card number for charging a fee.

The low resolution image data and templates are stored in the order receiving center 7 in the above embodiment. However, the present invention is not limited to the usage of the low resolution image data or templates, and any data having insufficient quality for printing and small data size but still preserving a characteristic of corresponding print quality image data or print quality image generating template may be used. More specifically, data compressed at a high compression ratio, data representing an outline of an image alone, data representing a monochrome image, or the like can be used.

What is claimed is:

1. An order information recording medium for a photographic service which records order information input via an order receiving server in a system comprising a data server which stores and manages at least a template describing a processing procedure for image data used for generating a photographic print, the order receiving server which receives a printing order based on the image data and the template, and a print server which is connected to both the data server and the order receiving server and generates a processed print by obtaining necessary image data and template according to an instruction from the order receiving server, said recording medium being recorded with;

image information specifying the image data for generating the processed print and showing information necessary for the print server in order to obtain the image data;

template information specifying the template to be used for the processed print generation and showing information necessary for the print server in order to obtain the template from the data server; and print information specifying the content of print output of the processed print.

2. An order file recording medium as claimed in claim 1 further recorded with output permission information requested by the system in the case where printing is ordered by specifying predetermined image data and/or a predetermined template.

3. An order file recording medium as claimed in claim 1 further recorded with processing information showing the content of various kinds of specification regarding a processing procedure which is necessary in the case where printing is ordered by specifying a template including the processing procedure regarding data other than image data.

4. An order file recording medium as claimed in claim 1 wherein the order information is recorded as a file having a hierarchy structure and each kind of information is described as a component of the hierarchy in the file.

5. An order file generating apparatus which generates an order file describing order information to be input via an order receiving server in a system comprising a printing quality data server which stores and manages at least a printing quality image generating template describing a processing procedure for printing quality image data used for generating a photographic print, the order receiving server which receives a printing order based on the printing quality image data and the printing quality image generating template, and a print server which is connected to both the printing quality data server and the order receiving server and generates a processed print by obtaining necessary printing quality image data and printing quality image generating template based on an instruction from the order receiving server, said apparatus comprising:

data presenting means which stores and manages monitoring quality image data representing the same image that is represented by the printing quality image data in a quality lower than that of the printing quality image data and a monitoring quality image generating template which carries out processing equivalent to the processing carried out by the printing quality image generating template on the monitoring quality image data and displays the monitoring quality image data and the monitoring quality image generating template on an order processing terminal;

image specifying means which receives specification of desired monitoring quality image data and a desired monitoring quality image generating template among the monitoring quality image data and the monitoring quality image generating templates displayed on the order processing terminal and transfers the specified monitoring quality image data and the monitoring quality image generating template to the order processing terminal;

finish confirming means which carries out processing on the monitoring quality image data having been transferred by using the monitoring quality image generating template having been transferred and generates and confirms a processed image representing the finish of the processed print; and file generating means which generates a file including image information showing information necessary for the print server in order to obtain printing quality image data corresponding to the specified monitoring quality image data and information necessary for the print server in order to obtain a printing quality image generating template corresponding to the specified monitoring quality image generating template from the printing quality data server.

6. An order file generating apparatus as claimed in claim 5 wherein, in the case where a template including a processing procedure regarding data other than image data is specified, the finish confirming means enables confirmation of various kinds of specification regarding the processing procedure and a result of carrying out the processing procedure; and the order file generating means describes processing information showing the content of the various kinds of specification regarding the processing procedure in the order file.

7. An order file generating apparatus as claimed in claim 5 further comprising output specifying means which enables specification of the content of output of the processed print, and the order file generating means describes the specified content of the output as output information in the order file.

8. An order file generating apparatus as claimed in claim 7 wherein the finish confirming means displays the processed image in an aspect ratio equal to that of a specified print size in the case where the print size of the processed print is specified as the content of the print output.

9. An order file generating apparatus as claimed in claim 5 wherein the image specifying means requests input of output permission information when predetermined image data and a predetermined template are specified; and the order file generating means records in the order file the output permission information having been input.

10. An order file generating apparatus as claimed in claim 5 wherein the printing quality data server stores and manages the printing quality image data.

11. An order file generating apparatus as claimed in claim 10 wherein the printing quality data server stores and manages the printing quality image data and the printing quality image generating template in separate recording apparatuses; and the data presenting means stores and manages the monitoring quality image data and the monitoring quality image generating template in separate recording apparatuses.

12. An order file generating apparatus as claimed in claim 5 wherein the system further comprises a plurality of printing servers;

the order receiving server selects the printing server based on the order information; and the selected print server generates the processed print.

* * * * *